United States Patent [19]
Walker et al.

[11] Patent Number: 5,467,394
[45] Date of Patent: Nov. 14, 1995

[54] METHOD OF IMPROVING SIDETONE ATTENUATION IN ELECTROACOUSTIC SYSTEMS

[75] Inventors: Michael Walker, Baltmannsweiler; Peter Heitkämper, Gross-Zimmern, both of Germany

[73] Assignee: Alcatel N.V., Rijswijk, Netherlands

[21] Appl. No.: 197,054

[22] Filed: Feb. 16, 1994

[30] Foreign Application Priority Data

Feb. 20, 1993 [DE] Germany ............... 43 05 256.8

[51] Int. Cl.⁶ ........................................... H04M 9/08
[52] U.S. Cl. .................. 379/392; 379/388; 379/389; 379/390; 379/391; 379/402; 379/410
[58] Field of Search ..................... 379/392, 391, 379/390, 388, 410, 389, 402

[56] References Cited

U.S. PATENT DOCUMENTS

| | | | |
|---|---|---|---|
| 4,891,837 | 1/1990 | Walker et al. | 379/390 |
| 5,170,430 | 12/1992 | Schuh | 379/390 |
| 5,235,637 | 8/1993 | Kraz et al. | 379/390 |
| 5,359,653 | 10/1994 | Walker et al. | 379/390 |

FOREIGN PATENT DOCUMENTS

| | | |
|---|---|---|
| 0413641 | 2/1991 | European Pat. Off. . |
| 0482745 | 4/1992 | European Pat. Off. . |
| 3724346 | 11/1988 | Germany . |
| 4130045 | 9/1991 | Germany . |
| 4229910 | 3/1994 | Germany . |

OTHER PUBLICATIONS

Proceeding of Eusipco–88 Fourth European Signal Processing Conference 5. Sep. 1988, Grenoble, France, Seiten 495–498.
XP92389 W. Armbruster 'High Quality Hands–Free Telephony using Voice Switching Optimized with Echo Cancellation'.

*Primary Examiner*—Jeffery A. Hofsass
*Assistant Examiner*—Jacques M. Saint-Surin
*Attorney, Agent, or Firm*—Ware, Fressola, Van Der Sluys & Adolphson

[57] ABSTRACT

To improve the anti-sidetone of electro-acoustic installations, particularly to improve the intercom characteristics of a telecommunication terminal, with compander control by an echo evaluation circuit (52) assigned to the compander (4), the latter has an echo compensator (40) located upstream, and/or a voice-controlled balance (51) is located downstream of the compander (4), which are controlled by the echo evaluation circuit (52) of the compander (4). To control the echo compensator (40) and/or the voice-controlled balance (51), the usual control circuitry required for their operation can be omitted. The result is a particularly effective, economical method with very good intercom characteristics.

18 Claims, 4 Drawing Sheets

METHOD OF IMPROVING SIDETONE ATTENUATION IN ELECTROACOUSTIC SYSTEMS

TECHNICAL FIELD

The present invention refers to a method for improving the acoustic anti-sidetone (induction) of electro-acoustic installations.

BACKGROUND OF THE INVENTION

Such a method is known from U.S. Pat. No. 4,891,837. The compander compresses the signals produced by the microphone, hereafter called transmitted signals, to a uniform signal level insofar as they are above a nominal value, and amplifies them to the maximum insofar as they are at the nominal value, and expands them insofar as they are below the nominal value. The compander curve LU2=f(LU1) has a steep expansion range and a flat compression range. The curve can be displaced or the steepness of the curve can be changed in the expansion range by feeding the output signals back to the input of the compander, through a low pass or a band-pass filter. In addition, the curve displacement can be produced in the receiving branch as a function of volume control. As a rule, the system parameters are adjusted by the manufacturer to the normal conditions of an office environment. A manual adjustment must be made if the conditions change, e.g. very high noise level, because an increase in the ambient noise above the starting point of the expansion causes the noise to be transmitted with increased amplification.

In such electro-acoustic installations, for example a telephone with intercom, the acoustic anti-sidetone depends on the arrangement of the directional effect of the sound transducer in the device, on the sensitivity of the microphone being used, and the adjusted reproduction volume. With the known compander method, a curve displacement is possible as a function of incoming signal. The expander range can be displaced in such a way, that the signal emitted by the loudspeaker and received by the microphone is always securely suppressed when a corresponding adjustment has been made on the terminal, i.e. by the manufacturer.

The use of such known, standardized circuits for terminals of different construction, e.g. with different anti-sidetones through both the housing and the air path, loudspeaker-microphone and/or the use of loudspeakers and/or microphones with different efficiencies, or when they are used in spaces that are acoustically very different from each other, it can happen that the possible manual adjustment of the anti-sidetone is no longer sufficient to ensure good vocal communication during use of the intercom.

For that reason, it was already proposed (in the applicant's P 42 29 910) to additionally control the compander as a function of the outgoing and incoming signal, by determining and weighting the voice level of the two signals, and utilizing the comparison value with the amplitude of the incoming signal to control the curve. The result is an anti-sidetone that adjusts to the ambient and terminal conditions, therefore an adaptive anti-sidetone. Thus, no manual adjustment and adaptation are required any more. This circuit functions as automatic echo damping with respect to the anti-sidetone, hereafter called AERL.

With unfavorable microphone-loudspeaker arrangements, particularly in small terminals, the intercom quality is not assured in all instances, even with AERL-control.

SUMMARY OF THE INVENTION

It is therefore the task of the invention to present a method that achieves better decoupling between loudspeaker and microphone in companders with AERL-control, at the lowest possible cost and material expense.

The task is fulfilled by a method of improving the transmission properties, in particular the anti-sidetone (induction) of an electro-acoustic installation equipped with adaptive dynamic (range) control, which contains a transmitting branch with at least one microphone and a transmitting amplifier, and a receiving branch with a receiving amplifier and at least one loudspeaker, and a compander with an echo evaluation circuit for the adaptive dynamic control, whose compression and expansion starting points can be changed as a function of transmission, reception, echo and noise signals, whereby these signals are determined and control signals are produced in accordance with their level, and are used to control the compander by changing and/or displacing the curves, particularly to improve the intercom characteristics of a telecommunication terminal, characterized in that, to increase the anti-sidetone, the compander is preceded by an echo compensator, with the input side located at the receiving branch and the output side at the transmitting branch, controlled by the incoming signal (U12; x(k)) and by the transmitted signal (U1; y(k)), and/or a voice-controlled balance, which is connected between the receiving branch and the transmitting branch, is located downstream of it and is controlled by the echo evaluation circuit of the compander. Since the control signals of the echo evaluation circuit, which already exist in the compander, are used to control the echo compensator and/or the voice-controlled balance, the construction of the echo compensator or the voice-controlled balance is very much simplified, so that an additional increase in the anti-sidetone is possible at low cost. Since these, as a rule, are short-range or short-term echos, the echo suppression by the adaptive digital filter with a short filter length can be particularly advantageous.

BRIEF DESCRIPTION OF THE DRAWINGS

Other advantageous details of the invention are described in the following by means of the configuration examples illustrated in the drawing, where.

BEST MODE FOR CARRYING OUT THE INVENTION

Figure 1:
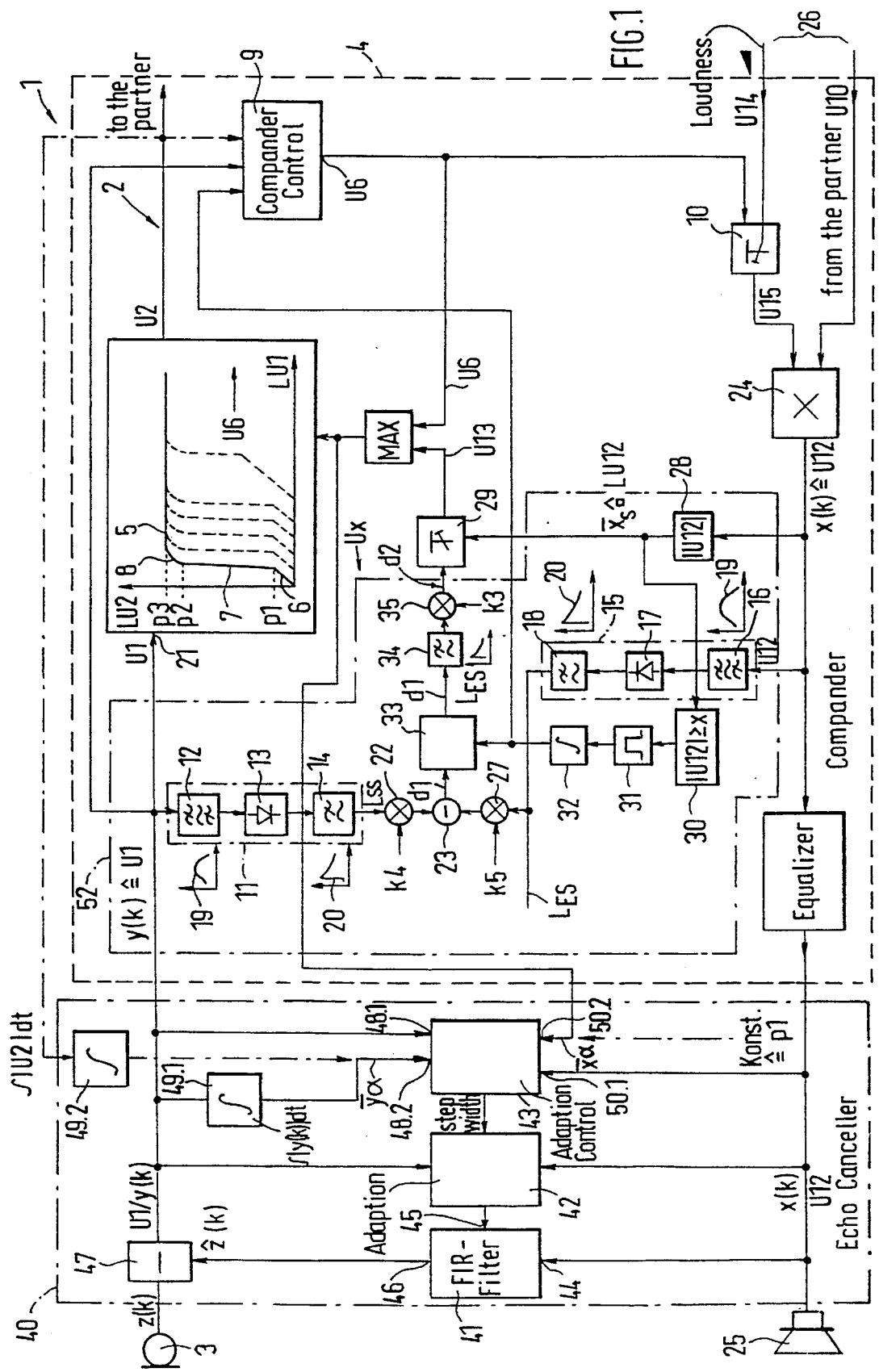
FIG. 1 is a block circuit diagram of a compander control with adaptive anti-sidetone and echo compensator.

In FIG. 1, an electro-acoustic installation in the form of a telecommunication terminal is numbered 1. It contains a transmitting branch 2 with a microphone 3 and a compander depicted by block 4. The latter has the characteristics known from DE-A 37 24 346 and basic circuits not shown in detail such as amplifier, comparator, compressor and expander, as well as pertinent control means, etc.. The compander has a characteristic curve 5, LU2=f(LU1), where LU1 is the output signal emitted by the microphone and U2 is the modified output signal emitted by the compander to the transmission line. The curve 5 has an initial range 6 below the starting point p1, in which low level acoustic signals are strongly suppressed. The expansion range 7 extends from point p1 to p2, which passes into the compression range between p2 and p3, and then runs nearly horizontal. Signals that are above level p1 are amplified in the steep, narrow expansion range 7, then they are amplified to the maximum in point p2 and compressed starting with point p3, so that a uniform output level is obtained after point p3. The curve control by means of curve displacement to the right—indicated by the broken curve line—takes place through the compander control 9, with which the receiving volume can be raised by a controllable damping unit 10, even with e.g. increased damping.

A voice detector 11 is provided to produce the adaptive anti-sidetone, which contains a band-pass filter 12, a rectifier 13 and a low pass filter 14 on the output side. The output signal U1 is supplied to the voice detector. Furthermore, a voice detector 15 with a band-pass filter 16, rectifier 17 and low pass filter 18 is provided, to which the incoming signal U12 is supplied. The band-pass filters 12, 16 are preferably designed so that they prefer the strongest frequencies in the voice frequency spectrum. m This is illustrated by the curves 19, which represent the filter characteristics.

The low pass filters 14 and 18 are designed to have a steep ramp slope, thus a short rising time e.g. 5 ms to 20 ms, particularly about 10 ms, and a slowly decreasing slope, therefore a long decay time of e.g. 30 ms to 100 ms, particularly about 65 ms, as indicated by the curves 20.

The output signal U1, which is supplied to the voice detector 11, is picked off between the microphone 3 and the input 21 of the compander 4, and supplied by the voice detector 11, at a voice level L22 that corresponds to the peak level of the voice signal, through a multiplier 22, to a detector 23, e.g. a differential value and threshold value detector.

The incoming signal U12 is picked off between a volume control 24 and a loudspeaker 25 of the receiving branch 26, and supplied to the voice detector 15. From here, a receiving level $L_{ES}$ is emitted and fed to the differential and threshold value detector 23 through a multiplier 27. The receiving level $L_{ES}$ can be weighted by the multiplier 27 with a weighting factor k5, and if required, the output level $L_{SS}$ can be weighted by the multiplier 22 with a weighting factor k4, so that the value of the transmitting level and the value of the receiving level can be adapted to each other.

The incoming signal U12, which can be picked off between volume control 24 and loudspeaker 25, is supplied to a function block 28, which generates the amount |U12| of the receiving signal and supplies it to a controllable damping unit 29, whose output emits a control signal U13 for control of the curve to the right of the drawing plane In addition, the amount |U12| of the incoming signal U12 is directly supplied to a switching device 33 by a threshold value detector 30, or by a pulse-former 31 and integrator 32.

The switching device 33 also receives the comparison value d1 emitted by the detector 23, which is supplied to the damping unit 29 either directly as a function of a control signal from integrator 32, or via a low pass filter 34 and a multiplier 35.

The low pass filter 34 is designed to have a long decay time, e.g. about 200 ms to 5 ms, and a short rising time, e.g. about 1 ms to 100 ms. The short-term value could correspond to about that of low pass filters 14, 18, or it is preferably shorter and its long-term value is longer than that of low pass filters 14, 18. The multiplier 35 can be used to weight the comparison value d2 with a weighting factor k3, and adapt it to different conditions for the correct or the optimum curve control.

According to the invention, the compander 4 is preceded by an echo compensator 40. It consists advantageously of an adaptive digital FIR-filter 41 with a pertinent coefficient-adapter 42 and an adapter control 43 which controls the step width e of the coefficient-adapter 42. The incoming signal x(k) or U12, picked off from the loudspeaker input, is applied to a filter input 44 of FIR-filter 41, and the output signal of the coefficient-adapter 42 is applied to a second control input 45 of FIR-filter 41. The output 46 of FIR-filter 41 is supplied to a subtracter 47 that is switched into the sending branch behind the microphone 3, and is subtracted from the output signal z(k). The filtered output signal y(k) or U1 is then located at the compander input 21.

The output signal y(k) is directly supplied to a first control input 48.1 of the adapter control 43, and the compander output signal U2 or the output signal y(k) is supplied to a second control input 48.2, via a circuit containing an integrator 49.1 or 49.2 with the derived step-width adaptation signal yα. The incoming signal x(k) is directly supplied to a third control input 50.1, and the step-width adaptation signal xα, derived from the incoming signal x(k), is supplied to a fourth control input 50.2. The adaptation signal is e.g. tapped off from the maximum value detector MAX of the compander 4, or it is formed by a constant value, e.g. corresponding to point p1 of the compander curve 5.

On the one hand, the task of the adapter control 43 is to control the step-width α as a function of the error. The input 48.1 is used for y(k) and 50.1 for x(k). On the other hand, the step-width α is determined as a function of the position in the compander curve 5 of the signal being emitted, thus its operating point. This can take place in different ways, some of which are illustrated in the drawing and described below.

According to the configuration shown by solid lines in FIG. 1, this is achieved by comparing the microphone level yα with the sidetone level xα located at the control input 50.2, and when the compression starting point p2 is exceeded, the step-width α is set to zero. As an alternative in accordance with the broken line, the comparison between the value yα obtained from U2 via the compander output and integrator 49.2, and a constant value p1 or p2 known from the curve 5, or an intermediate value between p1 and p2, can be used as the deciding criterion for changing the step-width. The change of step-width α can take place in one or several steps, or continuously between a maximum value and a minimum value, or zero.

The operation of this arrangement is as follows:

After starting, a basic adjustment of the curve is made in accordance with a preadjusted basic level, e.g. corresponding to an acoustically quiet, normal office environment. It is determined from the threshold value detector 30, whether an amount |U12| or |x(k)| of an incoming signal U12 or x(k) is present, which is larger than a previously specified value x.

At the same time, with an existing output signal U1 or y(k), a voice level $L_{SS}$ is generated and weighted with k4, and the incoming level $L_{ES}$ is produced by the voice detector 15 from the incoming signal U12 or x(k). The detector 23 makes the comparison value d1, e.g. the difference between $L_{SS}$ and $L_{ES}$, available at its output.

If the amount of |U12| or |x(k)| of the incoming signal U12 or x(k) is greater than the threshold value x, the switching unit 33, e.g. a "sample-and-hold" element, switches the comparison value d1 through the low pass filter 34 and the multiplier 35 to the controllable damping member 29. This is an instance in which a sidetone signal occurs as a result of the determined value, so that the anti-sidetone must be raised. This takes place via the controllable damping member 29 by making the control signal U13 available, which is derived from the amount of |U12| or |x(k)|, and whose magnitude is determined by the comparison value d2. With an existing amount of |U12| or |x(k)|, the curve 5 is displaced to the right, in the direction of higher damping, as a function of d2. This suppresses the formation of an echo.

The displacement is a function of the magnitude of the incoming signal, so that an automatic adaptive echo damping takes place. The switching groups shown to the left and under the curve field, thus form an echo evaluation circuit 52, for control of the anti-sidetone and therefore, to a certain degree, for the echo suppression.

According to the invention, an additional echo suppression takes place with control of the adapter control 43 by the output of the echo evaluation circuit 52 from the control signal U13, or in this case the output Ux of the maximum value detector MAX.

Figure 4:
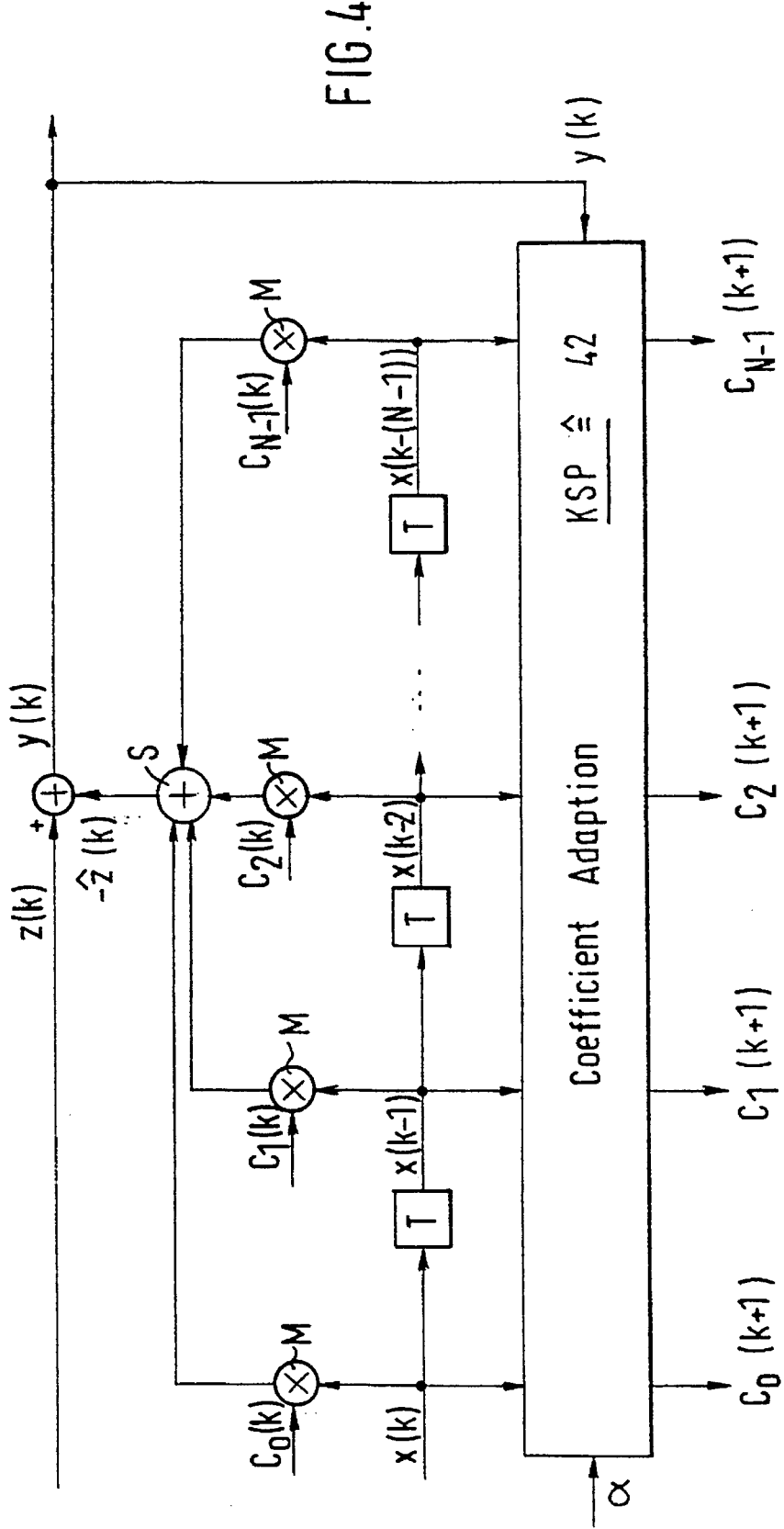
FIG. 4 is a function diagram of an adaptive FIR-filter.

To perform the echo suppression with the adaptive FIR-filter 41, the effect of such a filter is briefly explained in the following by means of FIG. 4:

As is known, a digital adaptive FIR-filter consists essentially of multipliers M, coefficient storage KSP and delay elements or scanned value storage elements T. A delay element T stores a scanned value and delays it by a scanning period. The filter length N is provided by the number of coefficients. The following calculations are performed during the scanning period:

In a first step, the last scanned values N of the incoming signal $x(k) \ldots x(k-(N-1))$ are multiplied by the corresponding coefficients $C_o(k) \ldots C_{N-1}(k)$, and all obtained values are summed by the adder S. The output signal $-z(k)$ of the FIR-filter during the scanning period n is therefore produced by:

$$\hat{z}(k) = \sum_{i=0}^{N-1} x(n-i) \cdot C(i) = \text{estimated value for suppression of the echo signals.}$$

All coefficients C(i) are reset in a second step. This takes place according to the "least-mean-square" method (LMS-method), according to the equation:

$$C(i)_{new} = C(i)_{old} + \alpha \cdot y(k) \cdot x(k-i)$$

where:
Ci)=Coefficients number i
x(k-i)=Incoming signal
y(k)=Error signal (residual echo)
α=Step-width To control or regulate the coefficient adjustment independently of the incoming level, the coefficient adjustment is adaptively performed or calculated in accordance with the following formula:

$$C_n(k+1) = C_n(k) + \frac{\alpha}{\sum_{i=0}^{N-1} x^2(k-i)} y(k) \cdot x(k-n)$$

The fastest coefficient adjustment is achieved with α=1, and the previous adjustment remains with α=0.

Subsequently the filter signal z(k) is subtracted from the reference signal, the outgoing signal z(k) of microphone 3 in the configuration example, thus forming the new error signal, or in this instance the outgoing signal y(k). The reaction speed of the system depends on the selection of the step-width α. If it is small, a stepped approach to the end value takes place in small stages. The adjustment time is therefore respectively long.

Although the approach is rapid with a large step-width α, no optimum adjustment can be obtained when the reference values are constantly changing, and the system is subject to disturbances.

The step-width α is not constantly specified by the known LMS-method or LMS-algorithm, but is adjusted as a function of the magnitude of the possible echo signal. The step-width α can be calculated in accordance with the following equation:

$$\alpha = \frac{1}{\sum_{i=0}^{N-1} x^2(k-i) \cdot (1 + E \cdot Z^2(k)) \cdot E^{-1} \cdot y^2(k)}$$

where $E \cdot Z^2(k)$ and $E \cdot y^2$=quadratic average value of z(k) or y(k).

With the standardized LMS-method or NLMS-algorithm, the step-width α is changed according to the size of the respective error (y(k)), for faster adaptation.

The FIR-filter serves to balance the transmission function, which is provided by the loudspeaker space or housing microphone. This is achieved by comparing the received signals with the signals occurring in the microphone. However, this comparison can only be performed if the microphone is not affected by the nearby speaker. For this reason, the filter adjustment may not be changed when such signals take place. To prevent this, the step-width α is set to zero during such signal phases.

During compander control with adaptive anti-sidetone, for example according to FIG. 1, control signals can already be picked off from the existing echo evaluation circuit 52, which is used for the compander curve control to adjust the anti-sidetone, and these control signals are used for the adaptive adjustment of step-width α of the upstream FIR-filter.

In the configuration example of FIG. 1, this is the control signal Ux emitted by the maximum value detector MAX for the control of curve 5. It is supplied as a step-width control signal xα to the control input 50.2 of adapter control 43, and the step-width control signal yα is supplied to the control input 48 of adapter control 43. The decision, whether the step-width α must be calculated or changed, e.g. set to zero, is made from the two values xα and yα, and a corresponding control signal is supplied to the coefficient adapter 42, and the compensation value z(k) is generated through the FIR-filter 41.

With the application according to the invention of an adaptive digital FIR-filter with a compander, which contains an echo evaluation unit, the calculation effort for a good echo suppression by the FIR-filter, in contrast to the use of such filters as echo cancelers until now, can be very small. With the application until now, several thousand scanning values, have to be calculated for each scanning period, in order to attain a somewhat satisfactory echo damping over a broad bandwidth. By contrast, with the method according to the invention, it is sufficient when the number of memory locations is 60 to 100, or a maximum of about 300. With a compander that is controlled by a digital signal processor, the required calculation can be performed by this processor, so that a highly efficient adaptive digital FIR-filter can be realized at very low cost for the indicated system and method.

With one configuration example, long-term echos were already sufficiently suppressed with 100 memory locations at a scanning frequency of 24 kHz.

Figure 2:
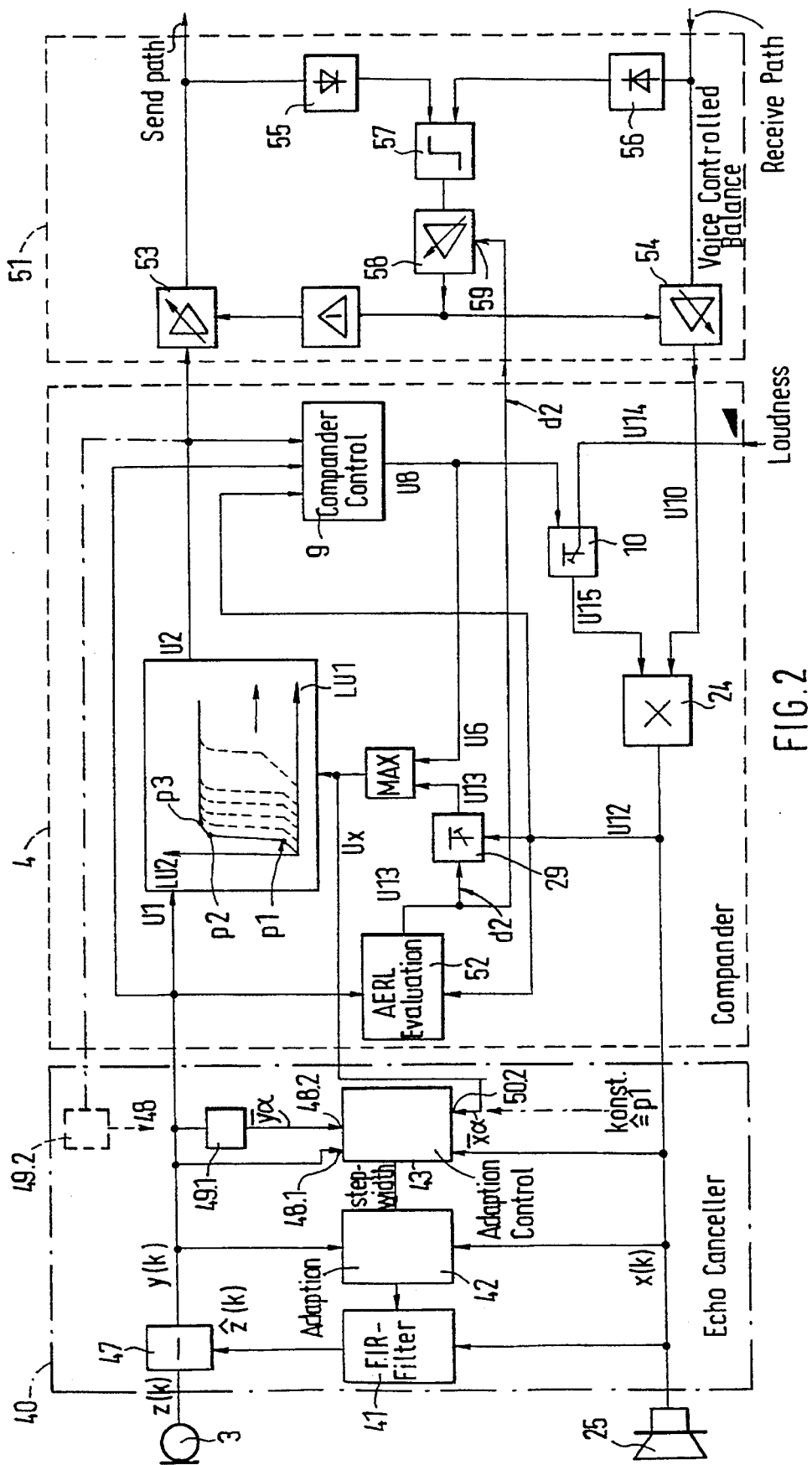
FIG. 2 is a simplified block circuit diagram of an arrangement according to FIG. 1, with a voice-controlled balance located downstream.

According to an advantageous development of the invention, the compander 4 with AERL can have a known voice-controlled balance 51 located downstream, instead of the upstream echo compensator 40, or in addition to it. The requirements on these could be small, since they only perform an additional damping task in this instance. On the other hand, under some circumstances, the number of the memory locations of the FIT-filter 41 can be further reduced and the calculation effort can be less. The block circuit diagram in FIG. 2 has a circuit to perform this method. The echo evaluation circuit formed by components 11, 15, 22, 23, 27 and 30 in FIG. 1 is drawn here as the AERL block 52.

The voice-controlled balance 51 contains a transmitting amplifier 53, a receiving amplifier 54, one each measuring device 55 or 56 allocated to the transmitting amplifier or the receiving amplifier, as well as a threshold value switch or comparator 57 controlled by the devices, and an amplifier controlled by the latter, whose control stroke can be adjusted by a control input 59. According to the invention, the control stroke of the voice-controlled balance 51 is adaptively controlled by amplifier 58, in that the signal d2, which serves to control the compander and is present for the stroke control in the AERL-block 52, is supplied to the control input 59. In this way, a potentially required residual echo damping can be performed with simple measures.

Figure 3:
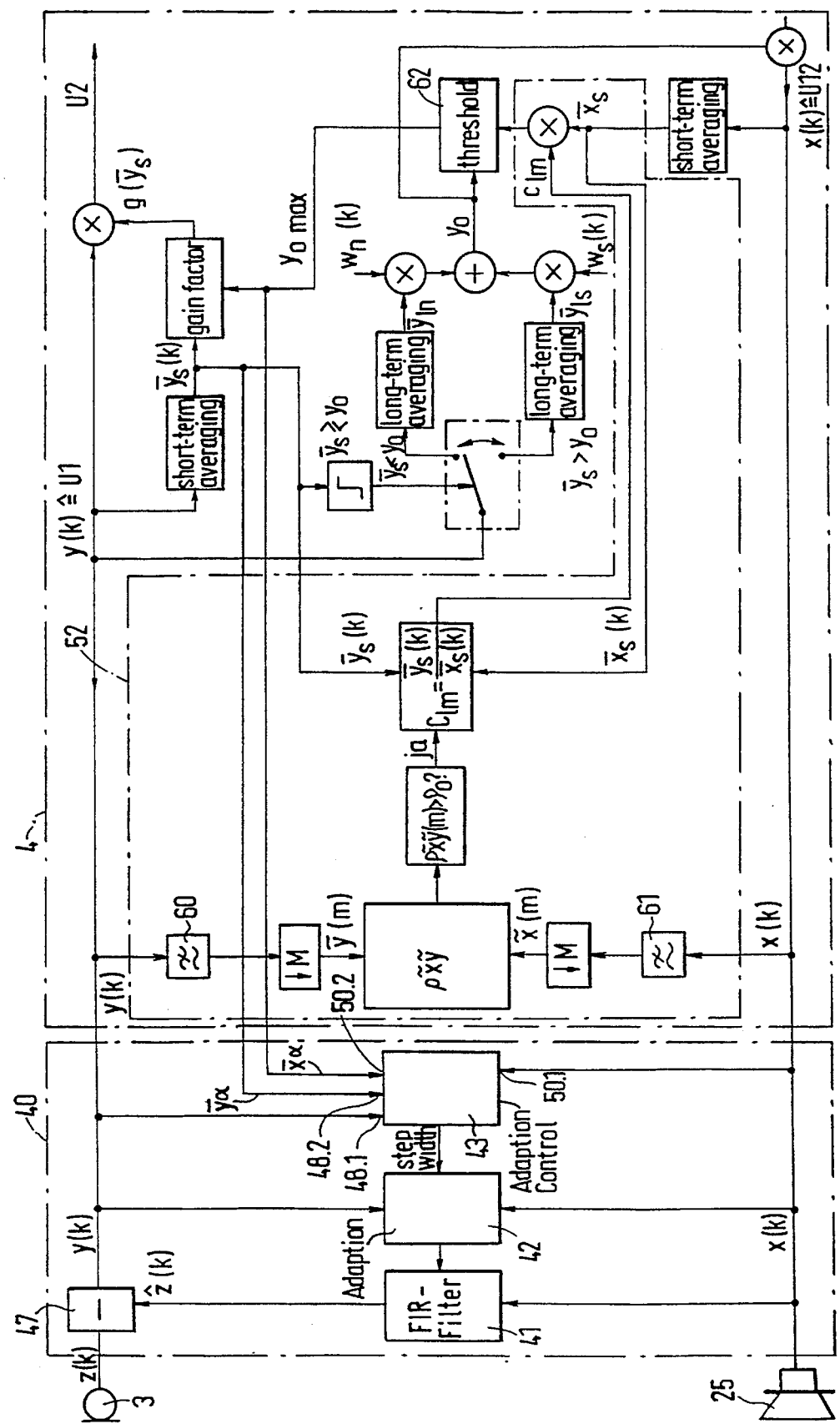
FIG. 3 is a block circuit diagram according to FIG. 1, but with digital evaluation and control.

FIG. 3 illustrates a block circuit diagram for a solution principle, in which digital processing of the signals takes place. Of course, a corresponding analog solution is also possible. In this case, the outgoing signals $y(k)$, scanned at the instant k, correspond to those marked U1 until now, and the incoming signals $x(k)$ to those marked U12 until now. Low pass filters are also present here, which have a short rising time and a long decay time for the voice recognition, and a long rising time and short decay time for noise recognition. Accordingly, a short-term average value $y_s$ or $x_s$ of the outgoing or incoming signal $y(k)$ or $x(k)$ can be determined, and a long-term average value $y_{in}$ for the noise portion in the outgoing signal $y(k)$, and a long-term average value $y_{is}$ for the voice portion.

These are used for a voice-controlled curve displacement or calculation, where the amplification factor $g(\bar{y}_s)$ is determined or calculated from the value of $\bar{y}_s$ and the specified value formed from the long-term average values $\bar{y}_{in}$ and $\bar{y}_{is}$ of the threshold value $y_o$ corresponding to the previously specified point 2 of curve 5, for the use of the compression.

To improve the anti-sidetone and echo suppression, and for adaptation of the acoustic system by means of curve control, a loudspeaker microphone coupling factor $C_{im}$ is formed from the relationship of the short-term average value of the outgoing signal $\bar{y}_s$ and that of the incoming signal $\bar{x}_2$, and the resulting value is additionally used to control the curve, by multiplying it with the short-term average value $\bar{x}_2$ of the incoming signal $x(k)$, and using it for control or calculation of the curve.

A new calculation of the loudspeaker microphone coupling factor $C_{im}$ always takes place when tightly coupled strong incoming signals occur in the outgoing signal $y(k)$ from the loudspeaker 25 to the microphone 3.

In addition, a correlation measurement is performed. The outgoing signal $y(k)$ and the incoming signal $x(k)$ are supplied separately through a low pass filter 60 or 61, and subsequently only the M-th scanned value from the k scanned values is used, where M can be about 5 to 20, especially 8. In this way, an envelope curve is formed from the values of $\tilde{y}(m)$ and $\tilde{x}(m)$. The correlation factor $p\tilde{y}\tilde{x}(m)$ can be calculated from the individual values with the formula:

$$p\tilde{x}\tilde{y}(m) = \frac{\sum_{n=0}^{N} \tilde{x}(m-n)\tilde{y}(m-n)}{\sum_{n=0}^{N} |\tilde{x}(m-n)\tilde{y}(m-n)|}$$

which is a measure of the signals coupled from the loudspeaker 25 to the microphone 3, and goes from 1 to zero with increasing deviation of the individual factors.

The calculated correlation factor $p\tilde{y}\tilde{x}(m)$ is then compared with a specified value po, which can be 0.9 for example. With a sufficiently high correlation factor, i.e. when the calculated value is greater than the specified value po, a new calculation of the loudspeaker microphone coupling degree $C_{im}$ is performed, and the curve is then controlled by the new value, or its value is recalculated.

A maximum value detector or decider 62 determines whether the value $y_o$ or the product of $C_{im}$ and $x_x$ is used for the control or the calculation of the curve.

The short-term average value $y_s(k)$ of the outgoing signal $y(k)$ or $x_s(k)$ of the incoming signal $x(k)$ can be calculated according to the following formula:

$q_s(k)=(1-a_f) |q(k)| +a_f q_s(k-1)$, for decreasing level when $|q(k)| < q_s(k-1)$ and $q_s(k)=(1-a_r) |q(k)| +a_r q_s(k-1)$, for increasing level, when $|q(k)| > q_s(k-1)$ ist where $q=y$ to calculate the value from the outgoing signal $y(k)$, $q=x$ to calculate the value from the incoming signal $x(k)$, $a_f$=parameters of the time constants for decreasing levels, and $a_r$=parameters of the time constants for increasing levels.

When the compander 4 is realized by a digital signal processor DSP, the curve is stored in the form of a basic curve as digital values in a memory assigned to the DSP. The curve change takes place e.g. by mathematical operations of the stored values with the calculated values of $C_{im}$, $y_o$, $y_s$ etc..

According to the invention, an echo compensator 40 is located upstream of the compander 4 with digital signal processing. The signals for control of the step-width of the FIR-filter 41 are derived for the step-width adaptation signal $\bar{y}\alpha$ from the short-term average value $\bar{y}_s(k)$, and the step-width adaptation signal $\bar{x}\alpha$ is derived from the output signal $y_{o\ max}$ of the maximum value detector 62. In this case as well, no additional measures are required to control the FIR-filter, which may be one with a short filter length.

As can be seen from the explanations, by comparison with the methods known until now, the method of the invention offers the advantage, that the step-width $\alpha$ of a FIR-filter, which is located upstream of a compander with AERL-control, can be adaptively turned off or controlled without additional expense for the filter control.

In addition, this combination also offers an economical, optimum, adaptive adjustment of the other system parameters as well.

Similar results are produced by the combination of a compander with AERL-control and a voice-controlled balance located downstream, which can additionally be used as an echo compensator.

We claim:

1. A method of improving the transmission properties, in particular the anti-sidetone (induction) of an electro-acoustic installation equipped with adaptive dynamic (range) control, which contains a transmitting branch with at least one microphone and a transmitting amplifier, and a receiving branch with a receiving amplifier and at least one loudspeaker, and a compander with an echo evaluation circuit for the adaptive dynamic control, whose compression and expansion starting points can be changed as a function of transmission, reception, echo and noise signals, whereby these signals are determined and control signals are produced in accordance with their level, and are used to control the compander by changing and displacing the compander curves, particularly to improve the intercom characteristics of a telecommunication terminal, characterized in that, to increase the anti-sidetone, the compander (4) is preceded by an echo compensator (40), with the input side located at the receiving branch (26) and the output side at the transmitting branch (2), controlled by the incoming signal (U12; x(k)) and by the transmitted signal (U1; y(k)), and a voice-controlled balance (51), which is connected between the receiving branch (26) and the transmitting branch (2), is located downstream of the compander and is further controlled by the echo evaluation circuit (52) of the compander (4).

2. A method according to claim 1, characterized in that an adaptive filter (41), particularly a digital adaptive filter, is used as echo compensator (40), whose step width ($\alpha$) is controlled as a function of the incoming signal (U12; x(k)) in such a way, that it is large with a large incoming signal (U12; x(k)), and small or zero with a nonexisting or very small incoming signal.

3. A method according to claim 2, characterized in that on the one hand, the step width ($\alpha$) is controlled by a signal level (U1; U2; y(k); $y_2(k)$) derived from the transmitting branch (2), and on the other by a signal level ($U_x$; $y_{o\ max}$) derived from the echo evaluation circuit (52).

4. A method according to claim 3, characterized in that the step width ($\alpha$) is switched in one or several steps from a large (maximum) value to a small value or to zero.

5. A method according to claim 3, characterized in that the step width ($\alpha$) is controlled in such a way, that it increases superproportionally with an increasing incoming signal (U12; x(k)), and decreases superproportionally with a decreasing incoming signal.

6. A method according to claim 5, characterized in that the step width control signals (x$\alpha$; y$\alpha$) are supplied to the filter (41) via a signal averager (49.1; 49.2).

7. A method according to claim 2, characterized in that a constant or essentially constant signal level is used as a step width control signal (x$\alpha$), which is so dimensioned that it corresponds to a curve control value ($U_{x1}$, $y_{o\ max}$) of the compander (4) curve (5) specified by the entire circuit, which is located between a value that determines a starting point (p1) of the expansion, and a value that determines the starting point (p2) of the compression.

8. A method according to claim 6, characterized in that step width control only takes place when the step width control signal (x$\alpha$) containing the information of the incoming signal (U12; x(k)) is equal to, or larger than the step width control signal (y$\alpha$) containing the information of the transmitted signal (U1; U2; y(k), $y_s(k)$).

9. A method according to claim 8, characterized in that a compander (4) is used, containing a peak value detector (MAX; 62), which is controlled by the transmitting branch input signal (U1; y(k)) and the transmitting branch output signal (U2; U6), and by the echo evaluation circuit (52), and the step width ($\alpha$) of the filter (41) is controlled by the output signal $U_x$; $y_{o\ max}$) of the maximum value detector (MAX; 62).

10. A method according to claim 9, characterized in that the downstream voice-controlled balance (51) control range is adjusted as a function of the output signal (d2; $U_x$) of the echo evaluation circuit (52).

11. A method according to claim 2, characterized in that the step width ($\alpha$) is switched in one or several steps from a large (maximum) value to a small value or to zero.

12. A method according to claim 2, characterized in that the step width ($\alpha$) is controlled in such a way, that it increases superproportionally with an increasing incoming signal (U12; x(k)), and decreases superproportionally with a decreasing incoming signal.

13. A method according to claim 2, characterized in that the step width control signals (x$\alpha$; y$\alpha$) are supplied to the filter (41) via a signal averager (49.1; 49.2).

14. A method according to claim 1, characterized in that a constant or essentially constant signal level is used as a step width control signal (x$\alpha$), which is so dimensioned that it corresponds to a curve control value ($U_x$, $y_{o\ max}$) of the compander (4) curve (5) specified by the entire circuit, which is located between a value that determines a starting point (p1) of the expansion, and a value that determines the starting point (p2) of the compression.

15. A method according to claim 2, characterized in that step width control only takes place when the step width control signal (x$\alpha$) containing the information of the incoming signal (U12; x(k)) is equal to, or larger than the step width control signal (y$\alpha$) containing the information of the transmitted signal (U1; U2; y(k), $y_s(k)$).

16. A method according to claim 2, characterized in that a compander (4) is used, containing a peak value detector (MAX; 62), which is controlled by the transmitting branch input signal (U1; y(k)) and the transmitting branch output signal (U2; U6), and by the echo evaluation circuit (52), and the step width ($\alpha$) of the filter (41) is controlled by the output signal $U_x$; $y_{o\ max}$) of the maximum value detector (MAX; 62).

17. A method according to claim 1, characterized in that the downstream voice-controlled balance (51) control range is adjusted as a function of the output signal (d2; $U_x$) of the echo evaluation circuit (52).

18. A method according to claim 2, characterized in that the downstream voice-controlled balance (51) control range is adjusted as a function of the output signal (d2; $U_x$) of the echo evaluation circuit (52).

* * * * *

UNITED STATES PATENT AND TRADEMARK OFFICE
CERTIFICATE OF CORRECTION

PATENT NO. : 5,467,394
DATED      : November 14, 1995
INVENTOR(S) : Michael Walker
              Peter Heitkamper It is certified that error appears in the above-indentified patent and that said Letters Patent is hereby corrected as shown below:

In claim 7, column 9, line 54

"$(U_{x1}, Y\ o\ max)$" should be --$(U_x, Y\ o\ max)$--

Signed and Sealed this

Fourth Day of June, 1996

Attest:

BRUCE LEHMAN

*Attesting Officer*     *Commissioner of Patents and Trademarks*